US007025807B2

(12) United States Patent
Grodal

(10) Patent No.: US 7,025,807 B2
(45) Date of Patent: Apr. 11, 2006

(54) METHOD FOR ABSORBING VAPORS AND GASES FROM PRESSURE VESSELS

(75) Inventor: Evert Grodal, Risor (NO)

(73) Assignee: Advanced Production and Loading AS, Kolbjornsvik (NO)

( * ) Notice: Subject to any disclaimer, the term of this patent is extended or adjusted under 35 U.S.C. 154(b) by 0 days.

(21) Appl. No.: 10/830,697

(22) Filed: Apr. 23, 2004

(65) Prior Publication Data

US 2004/0221718 A1 Nov. 11, 2004

Related U.S. Application Data

(63) Continuation of application No. PCT/NO02/00395, filed on Oct. 31, 2002.

(51) Int. Cl.
*B01D 53/14* (2006.01)

(52) U.S. Cl. ............................ 95/187; 95/211; 95/226; 95/237; 95/239; 220/89.1; 220/DIG. 24

(58) Field of Classification Search .................. 95/187, 95/210, 211, 226, 228, 237–240; 55/385.1, 55/385.4; 220/562–564, 694, 745, 749, 89.1, 220/DIG. 24

See application file for complete search history.

(56) References Cited

U.S. PATENT DOCUMENTS 1,930,592 A * 10/1933 Harnsberger ................. 422/41
2,157,579 A * 5/1939 Urquhart ..................... 220/749
2,640,627 A * 6/1953 Doelter ........................ 220/749
2,784,560 A 3/1957 Johnson, Jr. ...................... 62/1
2,849,150 A * 8/1958 Tompkins, Jr. .............. 220/749
2,853,149 A * 9/1958 Gosselin ....................... 96/168
2,947,379 A * 8/1960 Aubrey ......................... 95/204
3,123,249 A * 3/1964 Gorand et al. .............. 220/745
3,648,436 A * 3/1972 Schonewald et al. ......... 95/211
3,733,838 A 5/1973 Delahunty ..................... 62/54
3,778,969 A * 12/1973 Sudduth ....................... 95/237
3,861,890 A 1/1975 Doncer et al. ................. 55/88
3,881,894 A * 5/1975 Onufer .......................... 95/92
3,884,651 A * 5/1975 Velegol ......................... 95/24
3,907,542 A 9/1975 Kano et al.
3,921,412 A 11/1975 Heath et al. ................... 62/54
3,995,871 A * 12/1976 Vornberger et al. .......... 280/830
4,090,525 A * 5/1978 Potter ......................... 137/171
4,432,777 A * 2/1984 Postma ........................ 95/151

(Continued)

FOREIGN PATENT DOCUMENTS

DE 37 21 700 A1 * 1/1989

(Continued)

*Primary Examiner*—Robert H. Spitzer
(74) *Attorney, Agent, or Firm*—Heslin Rothenberg Farley & Mesiti P.C.

(57) ABSTRACT

The invention relates to a process for absorbing vapors and gasses by controlling overpressure in storage tanks during filling, transport and storing of fluids in liquid form. The process includes leading of gas down to the bottom of the tank, where a major part of the gas is absorbed in the tank's own liquid in an absorption device or optionally the liquid is supplied from an external source.

5 Claims, 3 Drawing Sheets

U.S. PATENT DOCUMENTS

| | | | | | |
|---|---|---|---|---|---|
| 4,671,071 | A | * | 6/1987 | Sasaki | 62/47.1 |
| 4,821,908 | A | * | 4/1989 | Yost | 220/86.2 |
| 4,859,405 | A | * | 8/1989 | Squarer et al. | 376/299 |
| 4,880,445 | A | * | 11/1989 | Watten | 95/211 |
| 5,076,822 | A | * | 12/1991 | Hewitt | 62/632 |
| 5,101,750 | A | * | 4/1992 | Dumas | 114/74 R |
| 5,165,561 | A | * | 11/1992 | Scheurenbrand et al. | 220/746 |
| 5,205,330 | A | * | 4/1993 | Sekine | 141/59 |
| 5,476,986 | A | | 12/1995 | Jacobsen | |
| 5,503,659 | A | * | 4/1996 | Crosman | 95/143 |
| 5,897,690 | A | * | 4/1999 | McGrew | 95/188 |

FOREIGN PATENT DOCUMENTS

| | | | |
|---|---|---|---|
| EP | 0 819 751 | | 1/1988 |
| JP | 63/19833 | | 5/1988 |
| WO | WO9740307 | | 10/1997 |
| WO | 98/43029 | | 10/1998 |
| WO | 01/48419 | A1 | 7/2001 |

* cited by examiner

METHOD FOR ABSORBING VAPORS AND GASES FROM PRESSURE VESSELS

CROSS-REFERENCE TO RELATED APPLICATIONS

This application is a continuation of PCT/NO02/00395 filed Oct. 31, 2002 and published in English as WO03/038333 on May 8, 2003, and claims priority from NO Patent Application 2001 5326 filed Oct. 31, 2001; the entire contents of the prior applications being incorporated herein by reference.

The present invention regards a method of absorbing vapours and gases by controlling overpressure in storage tanks for liquids, together with an application of the method.

When storing liquids in tanks, any movements or changes in pressure or temperature will cause the liquid to "breathe". The term "breathing" here indicates that molecules pass from the liquid phase to the gaseous phase or vice versa in order to achieve thermodynamic equilibrium. This mass transfer between liquid and gas can be considerable, and may take place across large temperature and pressure ranges for liquids containing many different components. The reason for this is that different components have different boiling points and vapour pressures, along with the fact that the liquid is capable of associating volatile components.

If a closed tank moves, the liquid will also move. This will cause local pressure changes to occur in the liquid, which may cause vapour to come out of the liquid, in turn resulting in a pressure increase in the tank. Upon cessation of this movement, the liquid will be able to absorb this vapour, resulting in a pressure reduction.

Both gas and liquid will change volume upon changes in pressure and temperature. When the temperature rises, most liquids and gases will occupy a larger volume (expansion). Therefore, if the tank volume does not change, the pressure will rise. When the temperature falls, the opposite will occur, i.e. a pressure reduction. Thus the thermodynamic relationships cause closed tanks to be subjected to alternating overpressure and underpressure.

Overpressure and underpressure may also occur in a closed tank when liquid is introduced to or evacuated from the tank.

There are limits to what can be tolerated in the way of pressure changes in tanks. In the event of an excessively low pressure, there is a risk of the tank collapsing, and in the event of an excessively high pressure, there is a risk of the tank cracking. Thus the problem associated with pressure control of storage tanks is two-part.

Today, a pressure reduction that may lead to the tank collapsing is often dealt with by introducing more external gas. As an example, when transporting petroleum products and crude oil in tankers, a so-called "inerting" process is carried out when the pressure is too low. This method consists in leading purified waste gas (inert gas) from the propulsion engine of the vessel down into the tanks. In the case of other types of transport or storage, e.g. transport of petrol by road or rail, the problem is often solved by allowing air to replace the missing gas volume.

A pressure increase that may lead to a tank cracking may today be dealt with in different ways. Floating roofs are used, as is the technique of passing the gas on to other tanks or processes for possible further treatment. However, when transporting petroleum products and crude oil onboard tankers, the problem is solved by opening the tank to let the gas escape to the atmosphere until the pressure in the tank has been sufficiently reduced. This is extremely polluting, and the authorities of various countries are working to introduce legislation that will reduce this type of discharge of VOC {"Volatile Organic Compounds"). Several publications exist which describe methods and systems that focus on solving the problem of overpressure. These solutions have comprised different suction and condensation devices, focusing especially on the problems associated with storage and transport of liquefied gases (LNG and LPG).

From NO 305 525 there is known a method and a device for storage and transport of liquefied natural gas. Decoction is removed from the tank and condensed in a condensation device with a cooler, and then passed back to the tank. The device separates methane and nitrogen, and the nitrogen is discharged to the atmosphere.

U.S. Pat. No. 2,784,560 teaches a method and a device for storage and handling of liquefied gas. Decoction from the liquefied gas is circulated in a device that cools by use of another liquefied gas and condenses the decoction, passing this back to the bottom of the tank.

U.S. Pat. No. 3,733,838 describes a system for re-liquefying the decoction from a liquefied gas. The system comprises an insulated storage tank, a venturi, a pump and a heat exchanger. The system is intended for use in connection with storage of liquefied gas. Part of the liquefied gas is compressed and expanded in a heat exchanger in order to provide cooling. The storage tank is cooled through expansion of a partially condensed stream that is passed into that part of the storage tank which contains vapour.

U.S. Pat. No. 3,921,412 describes a vapour recovery device that employs a condensing dispensing nozzle. The nozzle is placed in the fill opening and cools vapour/gas that flows out during filling, condensing this so that it drips back into the tank.

Norwegian patent application 1999 6471 regards a method, a device and a system for condensation of vapours and gases. The method is based on the circulation of liquid through a venturi that draws gas, and where the mixture is led to the bottom of the tank. The patent application argues that the gas will condense in the liquid on its way down to the tank, and that any further condensation will take place at the bottom of the tank.

Various absorption devices for removal of volatile organic compounds are known from U.S. Pat. No. 3,861,890, JP 63 119 833 and EP 0 819 751 A1, which devices are provided as separate units outside the tank or tanks from which the volatile compounds are to be removed.

The three first-mentioned publications describe rather comprehensive systems for storage of cooled liquefied gas. Only Norwegian patent application 1999 6471 attempts to solve the problems associated with handling and storage of volatile liquids on a large scale. In addition, various devices are known which suck vapour/gas from a tank that is being filled, condense the vapour/gas and passes the condensate back to the tank from which the filling is taking place. As neither today's solution for control of tank pressure during transport of crude oil nor other solutions seem to be acceptable, the present invention proposes an alternative solution to the problem.

The present invention regards a method of absorbing vapours or gases from one or more storage tanks for liquids, which method consists in leading the vapour/gas down to an absorption device placed in a submerged position in the tank liquid near the bottom of the storage tank; absorbing the gas into the tank liquid that surrounds the absorption device and circulates through this or is supplied from an external source; and leading the non-absorbed vapour/gas from the absorption device back to the gas zone at the top of the tank or out of the tank. Thus the absorption device is submerged in the tank liquid, which may optionally be used as the absorption medium for the vapour/gas. Consequently, the absorption efficiency is enhanced by the absorption taking place under the hydrostatic pressure from the overhead liquid.

By locating the absorption device down in a tank instead of outside the tank, the space requirements are reduced significantly, which is particularly beneficial with respect to ships. This will also result in the absorption device being subjected to a lot less in the way of external loads, while reducing the risk of corrosion. A further advantage of the method according to the invention is that the power requirement is reduced, as the pump is located in the tank, which reduces the pumping head. At the same time, any cavitation problems in the pump will be reduced as a result of not having to pump liquid out of the tank.

The placing of tall and heavy absorption towers on a ship's deck will often result in the ship's structure having to be reinforced. In a multi-tank system such as on a ship, where it may be desirable to have several absorption units, it would, in accordance with the present invention, be advantageous to place one absorption unit in each tank.

The invention further includes the application of the method to a tank ship and a tank truck.

The following will explain the invention in greater detail by means of an example of an embodiment and with reference to the accompanying drawings, in which.

Figure 1:
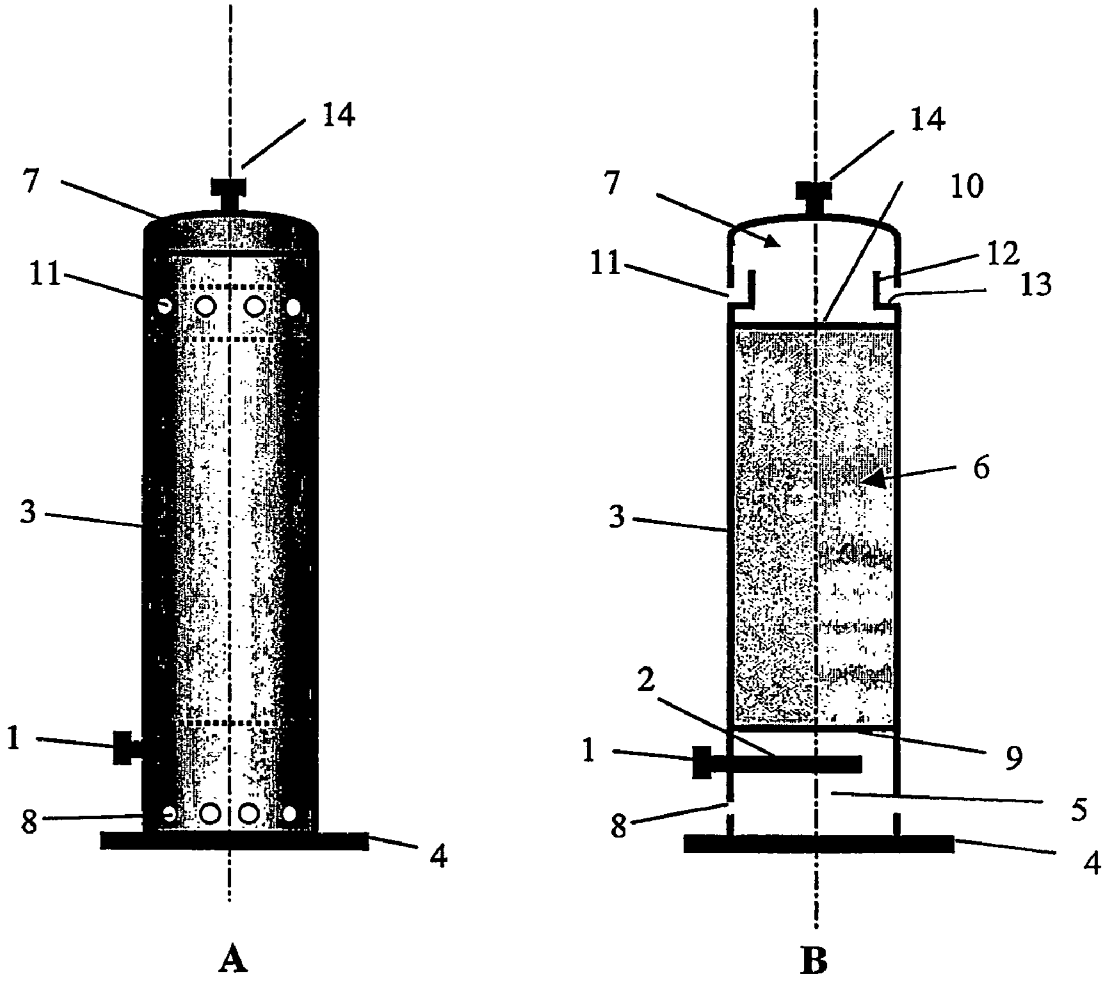
FIG. 1A shows an absorption device for use with the method according to the invention.
FIG. 1B shows an axial section through the absorption device in accordance with FIG. 1A.

FIGS. 1A and 1B show an example of an absorption device for implementation of the method. The absorption device is only active when submerged in the tank liquid. The device comprises a pipe casing 3 mounted on a bottom plate 4 and equipped with inlets for vapour/gas 1 and liquid 8 and outlets for vapour/gas 14 and liquid 11. The vapour/gas introduced at the bottom of the pipe casing is distributed in a bottom chamber 5 by means of a perforated pipe 2 or other distributing means. As a result of its low density relative to the liquid, the vapour/gas will travel upwards in the bottom chamber and pass a perforated column base 9, whereupon it will percolate through the absorption chamber 6. The absorption chamber contains a structured packing or other mechanical equipment that gives good contact between the liquid and the vapour/gas. Unabsorbed vapour/gas will leave the absorption chamber through a column top 10 consisting of a screen. The liquid and the vapour/gas will move into the top chamber 7, where they are separated by gravity. The vapour/gas will collect at the top of the top chamber prior to being released out through the outlet 14. The liquid issues from the liquid outlets 11, which are protected by a pipe stub 12 fixed to a flange collar 13, which in turn is fixed to the pipe casing. The pipe 12 will force the liquid to flow down in order to escape the top chamber, and this reduces the chances of vapour/gas being able to escape through the liquid outlets.

The absorption device presented herein exhibit similarities to commercial absorption columns but have several essential differences. Firstly, it is only active when submerged in the absorption liquid. Secondly, it also represents a new principle of operation, as the absorption liquid is not pumped through the device due to the difference in hydrostatic pressure between the inside and the outside. Moreover, the absorption takes place with gas and liquid flowing co-currently, which is in contrast to the more common countercurrent absorption device.

Figure 2:
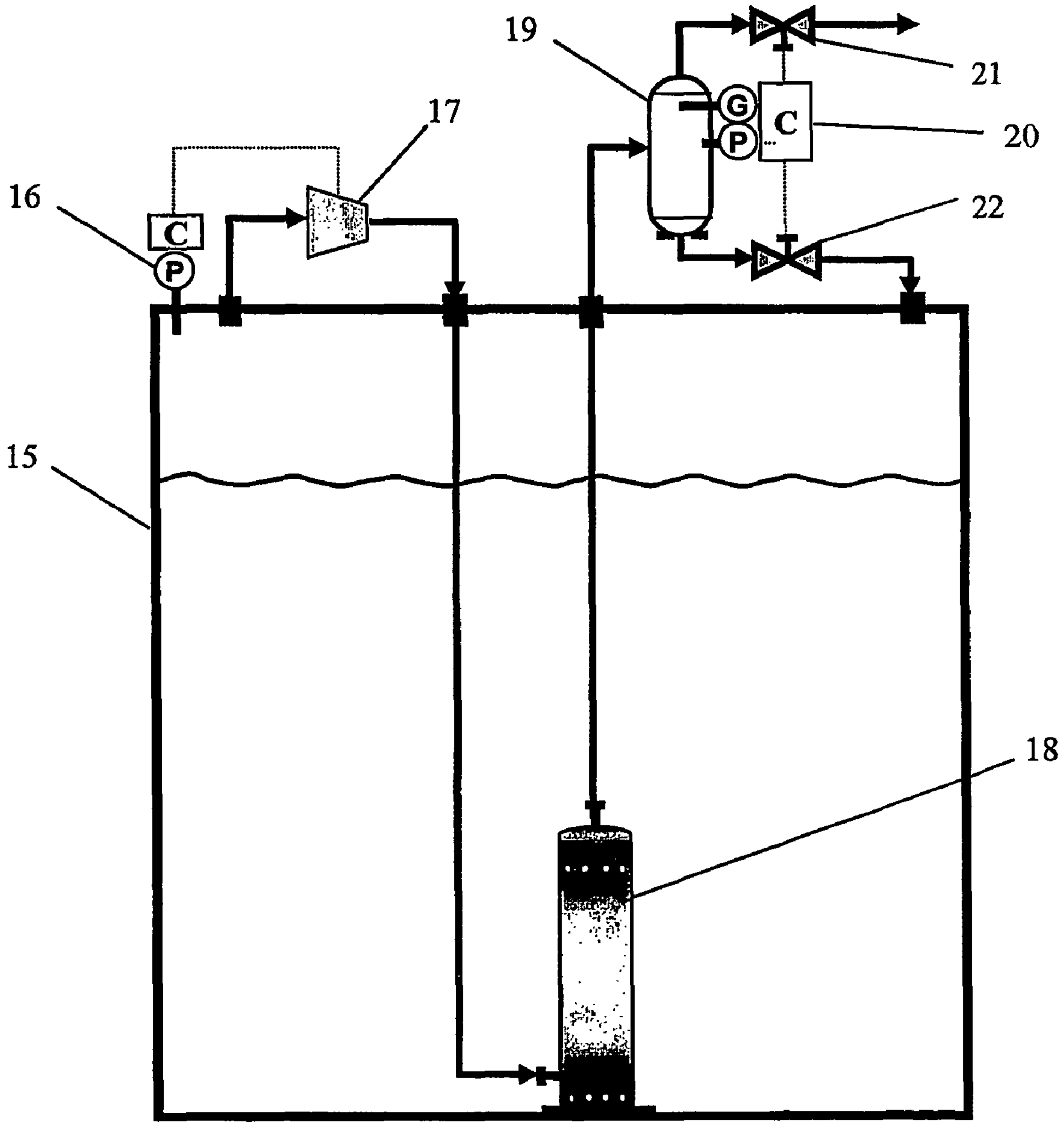
FIG. 2 shows the absorption device positioned in a tank.

FIG. 2 shows the absorption device of FIGS. 1A and 1B positioned down in a tank 15. Vapour/gas from the storage tank 15 is passed via a pipe to a compressor/pump 17. The compressor/pump is controlled by a pressure sensor 16. The compressor/pump sends the vapour/gas via a pipe to the absorption device 18. The vapour/gas is absorbed by the liquid circulating through the absorption device. If the liquid is not able to absorb all the vapour/gas, the excess fraction of the vapour/gas percolates up to the top of the absorption device and on through a pipe to a tank 19. In the tank, the composition of the vapour/gas is measured, and controller 20 determines whether the vapour/gas is to be discharged to the atmosphere through valve 21 or be sent back to the storage tank via valve 22.

Figure 3:
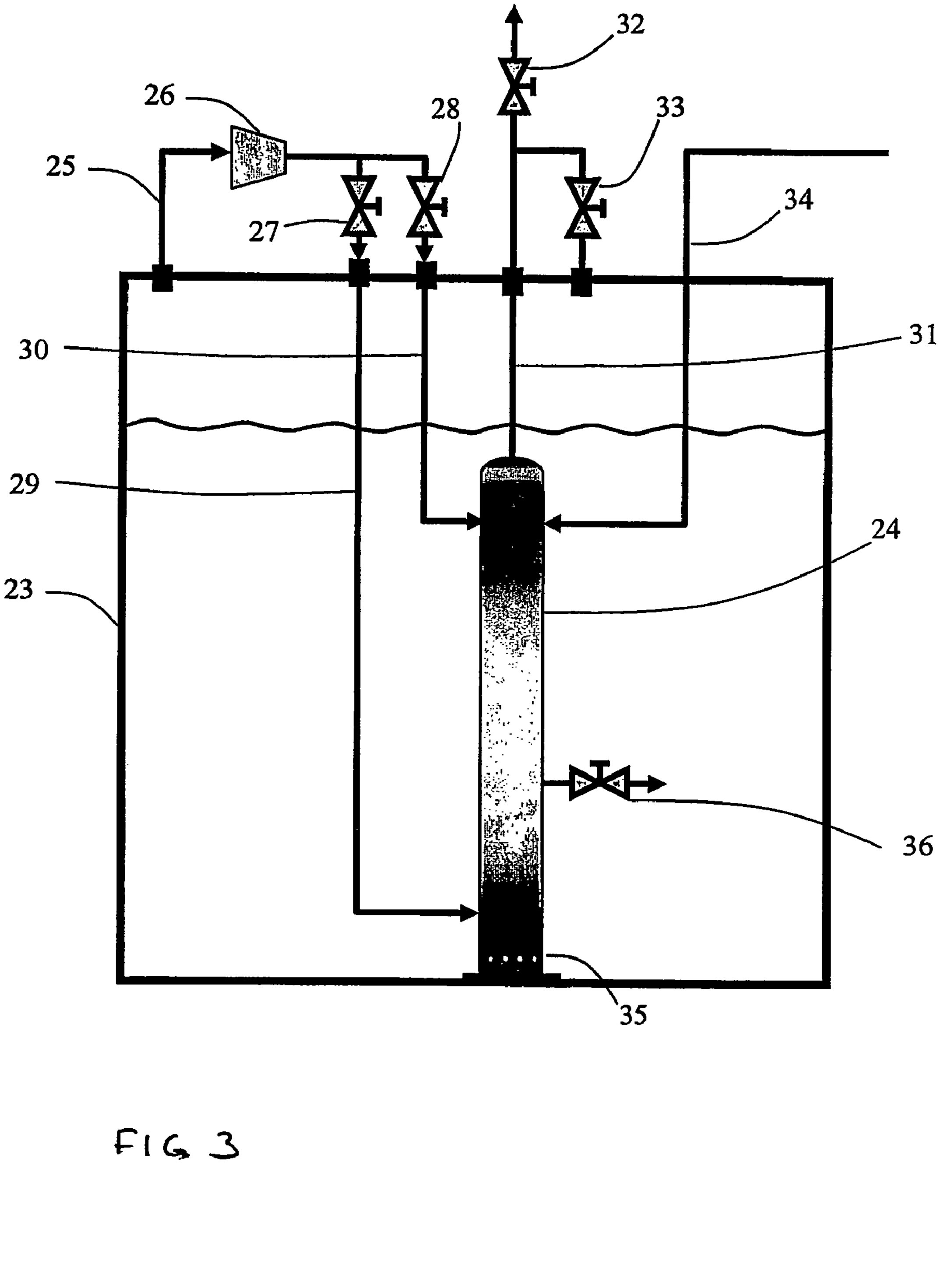
FIG. 3 shows an alternative embodiment of the absorption device in FIGS. 1 and 2.

FIG. 3 shows an alternative embodiment of the method according to the invention. Here, a conventional absorption device 24 is shown submerged in a storage tank 23. A conventional absorption column chiefly consists of a pipe filled with a mechanical structure that mixes the gas/vapour with liquid, so as to create the greatest possible surface area between the two and thus good high mass transfer. FIG. 3 also shows a piping system that allows the absorption process to be carried out in several ways. The gas/vapour from the tank 23 is passed via a pipe 25 to a compressor/pump 26. The gas/vapour passes down to the bottom of the absorption column 24 through valve 27 and via pipe 29. Alternatively, the gas/vapour may be passed through valve 28 and via pipe 30 to the top of the absorption column 24. The unabsorbed gas/vapour is led out of the absorption column through pipe 31. Through valve 32, the gas/vapour can be sent to another process or be passed out the atmosphere. Alternatively, the gas/vapour can be returned to the storage tank 23 through valve 33. Crude oil or other petroleum products from another tank may be used as an absorption medium and be introduced into the absorption column through pipe 34. The orifices 35 at the bottom of the absorption column 24 allow liquid to flow out of or into the absorption column. Valve 36 allows liquid to flow out of the absorption column at a higher point when gas/vapour is introduced at the bottom of the absorption column. The method described herein allows absorption of gas/vapour both through the gas/vapour flowing co-currently with the, absorption medium and through the two phases flowing counter-currently. Whether one method is better than the other will depend on the flow rates of gas/vapour and liquid, and on whether the absorption medium is the liquid in the tank or is supplied from an external source.

Even though the absorption device of the above described embodiments is described as an absorption column filled with mechanical structure, it is also conceivable for the absorption device to be constructed as a gas-liquid mixer consisting of a pipe with an internal mechanical structure that causes a turbulent mixing of the gas and the liquid, which will result in a higher degree of absorption. Furthermore, one may conceivably also use a single absorption device consisting only of a pipe in which the gas/vapour is introduced through nozzles that cause the gas/vapour to form small bubbles in the pipe, whereby bubble absorption will take place.

The method and the application according to the invention will be very environmentally friendly, as it will eliminate today's VOC discharges. The system may also be used in a situation where several tanks are connected via pipelines, such as in the case of transport of petroleum products onboard tank ships. In such a case, the system will be able to contribute to a desired pressure reduction in all the tanks. The argument can also be made that the invention will have a valuable technical impact for the oil companies and the companies transporting the crude oil. Today, the oil is processed on the platform so as to contain small amounts of the lighter fractions, to avoid exactly these problems of discharges during transport. In terms of economics however, it is desirable to send the crude oil to the refineries containing as much as possible of the lighter fractions, to allow the oil companies to obtain the highest possible price for the cargo. As such, a tank ship equipped with a process plant that can handle lighter grades of oil without discharges will be in greater demand and be able to obtain higher freight rates.

The invention claimed is:

1. A method of controlling overpressure in a storage tank storing a liquid by absorbing vapour/gas, comprising:

leading a vapour/gas from a gas zone within a top section of the storage tank to an absorption device placed in a submerged position in the liquid in the tank, near a bottom of the tank;

absorbing the vapour/gas into tank liquid that surrounds the absorption device and circulates through the device, or is supplied from an external source; and returning unabsorbed vapour/gas from the absorption device to the gas zone at the top section of the tank or leading the unabsorbed vapour/gas out of the tank.

2. The method in accordance with claim 1, wherein the returning comprises selectively returning unabsorbed vapour/gas from the absorption device to the gas zone or leading the unabsorbed vapour/gas our of the tank.

3. The method of claim 2, further comprising: measuring composition of the unabsorbed vapour/gas and determining with a controller whether the unabsorbed vapour/gas is returned to the gas zone or led out of the tank.

4. Application of the method according to claim 1 onboard a tank ship.

5. Application of the method according to claim 1 on a tank truck.

* * * * *

UNITED STATES PATENT AND TRADEMARK OFFICE

CERTIFICATE OF CORRECTION

PATENT NO. : 7,025,807 B2

APPLICATION NO. : 10/830697

DATED : April 11, 2006

INVENTOR(S) : Grodal

It is certified that error appears in the above-identified patent and that said Letters Patent is hereby corrected as shown below:

Column 6,
Line 14, delete "our" and insert -- out --.

Signed and Sealed this

Twenty-seventh Day of June, 2006

JON W. DUDAS

*Director of the United States Patent and Trademark Office*